US005137295A

United States Patent [19]

Peek

[11] Patent Number: 5,137,295

[45] Date of Patent: Aug. 11, 1992

[54] WHEELCHAIR WITH ANTI-TIP ASSEMBLY

[76] Inventor: Gregory A. Peek, 8955 Ridgeline Blvd., Highlands Ranch, Colo. 80126

[21] Appl. No.: 662,185

[22] Filed: Feb. 28, 1991

[51] Int. Cl.[5] .............................................. B62K 15/00

[52] U.S. Cl. .............................. 280/304.1; 280/250.1; 297/DIG. 4

[58] Field of Search ............... 280/304.1, 250.1, 288.4, 280/298, 301; 297/310, DIG. 4

[56] References Cited

U.S. PATENT DOCUMENTS

| | | | |
|---|---|---|---|
| 2,465,037 | 3/1949 | Ream | 280/301 X |
| 3,256,040 | 6/1966 | Mize et al. | 297/310 |
| 3,848,883 | 11/1974 | Breacain | 280/250.1 |
| 4,098,521 | 7/1978 | Ferguson et al. | 280/250.1 |
| 4,227,740 | 10/1980 | East | 297/310 |
| 4,453,732 | 6/1984 | Assanah et al. | 280/250.1 X |
| 4,565,385 | 1/1986 | Morford | 280/304.1 |

*Primary Examiner*—Charles A. Marmor
*Assistant Examiner*—Kevin Hurley
*Attorney, Agent, or Firm*—Charles C. Logan, II

[57] ABSTRACT

A wheelchair having an active anti-tipper assembly to prevent its rider from tipping over backwards when the backrest frame is reclined rearwardly. The anti-tipper assembly has a pair of laterally spaced linkage members whose top ends are pivotally connected to the backrest frame. The bottom ends of the linkage members are pivotally connected to leg members at a point intermediate their length. The leg member in turn have their top ends pivotally connected to the rear ends of the longitudinally extending bottom frame members of the wheelchair frame. The linkage members are adjustable in length. The anti-tipping leg members have rollers secured to their rearward ends.

4 Claims, 1 Drawing Sheet

WHEELCHAIR WITH ANTI-TIP ASSEMBLY

BACKGROUND OF THE INVENTION

The invention relates to wheelchairs and more specifically to an active anti-tipper assembly that automatically prevents the wheelchair from tipping over rearwardly when the backrest frame is reclined.

Some present day wheelchair models have a reclining back and others have a rotational seating system wherein the seat and back are rigidly connected to each other and the seal pivots about some point. Most of these seats have a reclining structure that is power operated. Fixed anti-tipping structures are commonly used (or at least supplied by chair manufacturers), but they will allow the chair to tip some distance before contacting the ground. They must have some distance from the ground up to the anti-tipper wheel for normal operation, such as curb cuts, and this clearance will allow this chair to tip.

It is an object of the invention to provide a novel active anti-tipping assembly for a wheelchair that will be automatically repositioned when the backrest frame is pivoted rearwardly in order to prevent the wheelchair from tipping over rearwardly.

It is also an object of the invention to provide a novel anti-tipper assembly that can be retro-fitted to existing standard wheelchair frames.

It is another object of the invention to provide a novel anti-tipper assembly that is economical to manufacture and market.

It is a further object of the invention to provide a novel anti-tipper assembly that can be used with both reclining back wheelchairs and rotational seat wheelchairs.

It is an additional object of the invention to provide a novel anti-tipper assembly that has adjustable length linkage members that can be used to vary the distance the anti-tipping leg members travel before they approach the surface upon which the wheelchair travels.

SUMMARY OF THE INVENTION

The novel anti-tipper assembly has been designed to be used with standard power wheelchairs either having a reclining back or a rotational seat structure. However, the novel anti-tipper assembly is not limited to use with power chairs, but could be used on any wheelchair which has a reclining back or a rotational seating system.

A major advantage of the active anti-tipper structure is that when the recliner or tilt sea is in the normal upright position, the anti-tipper does not interfere with normal use of the wheelchair. However, when the seat or back is moved from the normal upright position into a reclined or tilt position, the active anti-tippers start to move closer to the ground until the seat/back reaches its fully reclined/tilted position. At that point the active anti-tippers are just barely above the ground so that the chair can not tip over backwards.

The anti-tipper assembly has a pair of laterally spaced elongated linkage members whose top ends are pivotally mounted to brackets secured to the respective backposts of the backrest frame. The bottom ends of the linkage members are pivotally secured to brackets located intermediate the length of the anti-tipping leg members. The top end of the anti-tipping leg members are pivotally secured to mounting brackets secured to the end of the respective longitudinally extending bottom frame members.

DESCRIPTION OF THE PREFERRED EMBODIMENT

Figure 2:
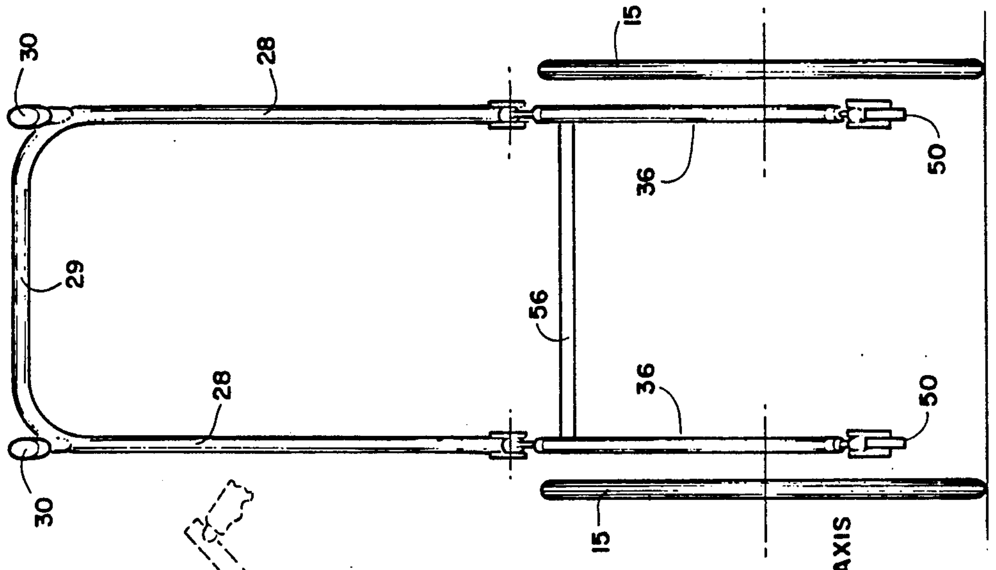
FIG. 2 is a rear elevation view of the schematic drawing illustrated in FIG. 1.
Figure 1:
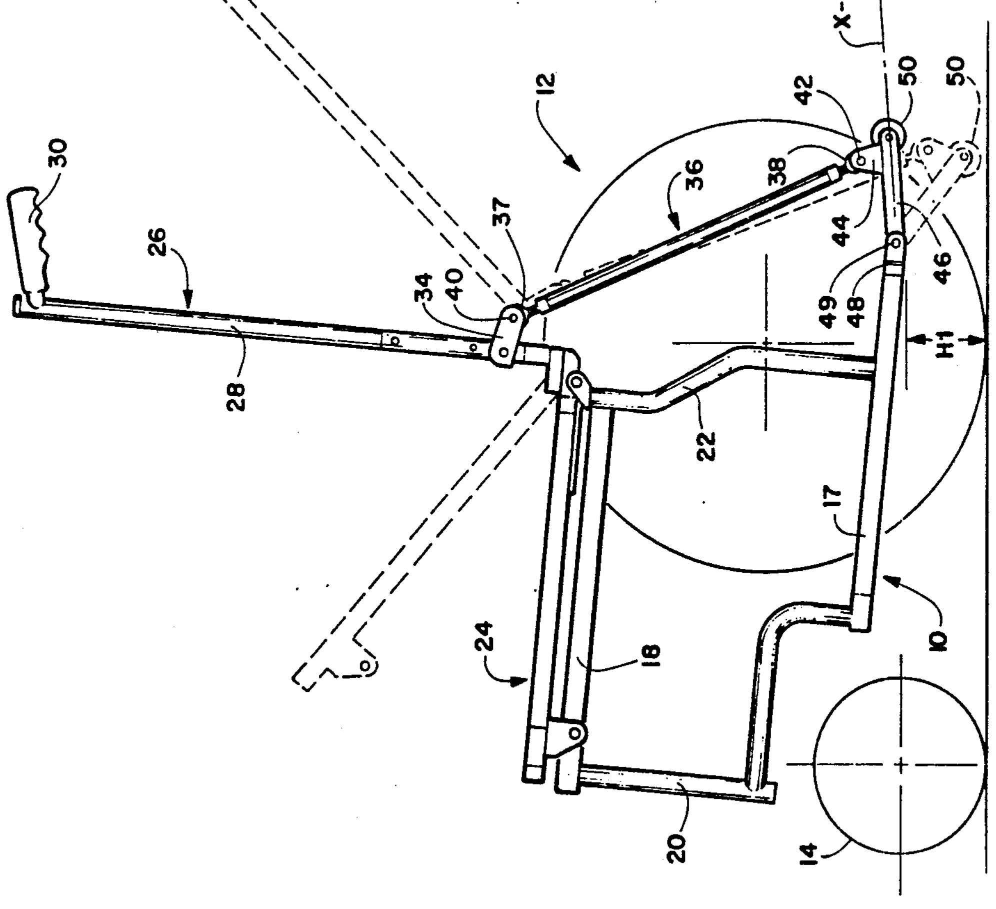
FIG. 1 is a schematic side elevation view illustrating the basic structure of the wheelchair frame and the manner in which the anti-tipper assembly is secured thereto.

Applicant's novel wheelchair will now be described by referring to FIGS. 1 and 2. The standard wheelchair frame is generally designated numeral 10 and the anti-tipper assembly is generally designated numeral 12.

Standard wheelchair frame 10 has front wheels 14, rear wheels 15, bottom frame members 17, top frame members 18, front upright posts 20 and rear upright posts 22.

Seat frame 24 is pivotally mounted on pivot pin 25 to secure it to the wheelchair frame. Backrest frame 26 is rigidly secured to seat frame 24 so that they move as one integral member.

Back rest frame 26 has a pair of laterally spaced back posts 28, a cross member 29, and handgrips 30. Clevis mounting brackets 34 are rigidly secured to back posts 28 adjacent their bottom ends.

The anti-tipper assembly 12 has a pair of elongated linkage members 36 having an eyebolt 37 threaded into their top ends and an eyebolt 38 threaded into their lower end. Pivot pin 40 passes through eyebolt 37 to pivotally secure it to clevis mounting bracket 34. Pivot pin 42 passes through eyebolt 38 and bracket 44 to pivotally secure the lower end of linkage members 36. Anti-tipping leg members 46 are pivotally secured to clevis mounting brackets 48 by pivot pins 49. Rollers 50 are secured to the rearward ends of anti-tipping leg members 46. The rear end of bottom frame members 17 are positioned a height H1 above the surface upon which the wheelchair travels.

What is claimed is:

1. A wheelchair comprising:

a standard wheelchair frame having a pair of laterally spaced longitudinally extending bottom frame members each having a front end and a rear end, said rear end being a predetermined height H1 above a surface upon which a wheelchair travels:

a seat frame secured to said standard wheelchair frame;

a backrest frame having a pair of laterally spaced upright oriented longitudinally extending back post members, said back post members having a top end and bottom end;

means for pivoting said backrest frame from an upright position to a reclined position; and an anti-tipper assembly comprising a pair of laterally spaced longitudinally extending linkage members each having a top end and a bottom end, a pair of elongated anti-tipping leg members having a predetermined length and each having a forward end and a rearward end, the respective forward ends of said anti-tipping leg members being connected to the respective rear ends of said bottom frame members, means pivotally connecting the respective bottom ends of said linkage members to said respective anti-tipping leg members, means pivotally connecting the respective top ends of said linkage members to said backrest frame so that when said backrest frame is pivoted rearwardly said anti-tipping leg members are automatically repositioned so that they move closer to the surface upon which the wheelchair travels and prevents the wheelchair from tipping over rearwardly.

2. A wheelchair as recited in claim 1 wherein said anti-tipping leg members have a roller mounted on their rearward end.

3. A wheelchair as recited in claim 1 further comprising means for adjusting the length of said linkage members.

4. A wheelchair as recited in claim 1 wherein said backrest frame is rigidly connected to said seat frame so that they pivot rearwardly as a single structure.

* * * * *